Jan. 27, 1953  M. MENNESSON  2,626,464
MICROMETER
Filed Jan. 9, 1945  2 SHEETS—SHEET 1
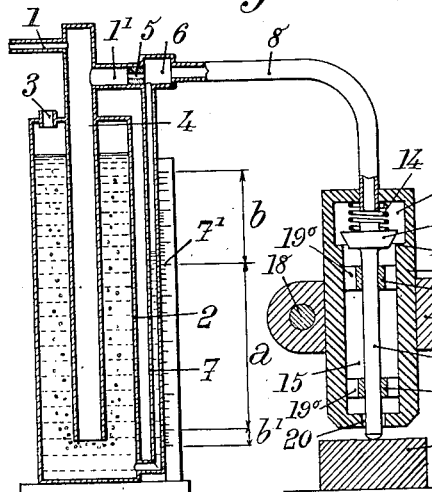
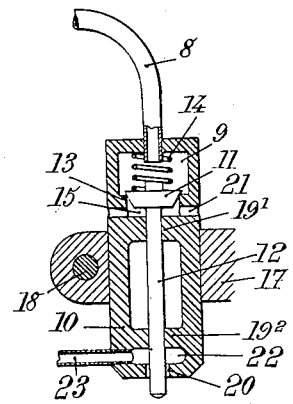
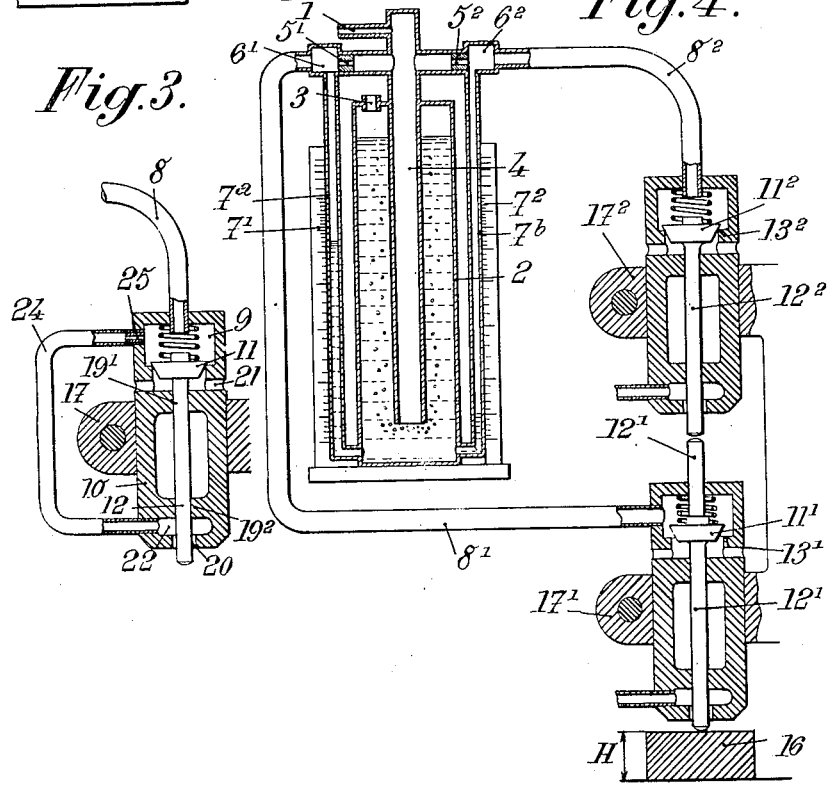
Marcel Mennesson
INVENTOR
BY Mock & Blum
ATTORNEYS Jan. 27, 1953          M. MENNESSON          2,626,464
                          MICROMETER
Filed Jan. 9, 1945                         2 SHEETS—SHEET 2
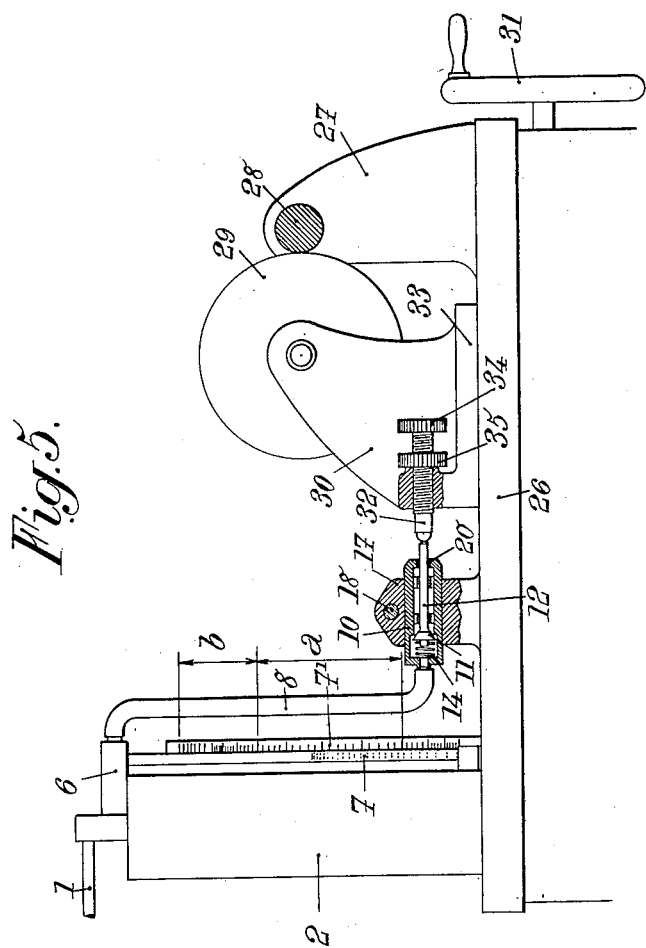

Patented Jan. 27, 1953

2,626,464

UNITED STATES PATENT OFFICE 2,626,464

MICROMETER

Marcel Mennesson, Neuilly-sur-Seine, France, assignor to Societe Anonyme de Construction de Materiel Automobile (S. A. C. M. A.), Neuilly-sur-Seine, France, a society of France Application January 9, 1945, Serial No. 572,056
In France January 26, 1944

3 Claims. (Cl. 33—172)

The present invention relates to methods and apparatus for measuring or checking, through pneumatic micrometry, the value of a magnitude, and especially for measuring or checking the distance between two solid bodies or the relative displacements that take place between these two bodies, for instance a tool and a piece of work. According to pneumatic micrometry methods, this measurement is based upon the variations of the rate of flow of a permanent gas, fed under constant pressure, for instance compressed air, when this gas passes successively through a first orifice and a second orifice into a medium, such as the atmosphere, also at uniform pressure, the section of the second orifice being a function of the value of the magnitude to be measured, and the variations of its rate of flow being indicated by manometric means for giving the drop of pressure undergone by the gas when it flows through the second orifice, said manometric means being connected with the portion of the gas circuit between the two above mentioned orifices.

At the present time, a precision of one thousandth of a millimeter is commonly required for repetitious work, and consequently not only is it necessary to have measurement or checking apparatus capable of working with such a high precision, but the machine-tools must be fitted with apparatus of the same precision, and capable of indicating, with an equal precision, the variation of the dimension of the piece that is being worked upon, during this work, or the relative displacement between this piece and the tool. Thus, the operator can carry out more easily than up to now the machining of this piece while keeping within the tolerance limits that have been fixed. For instance in the case of a movable tool acting upon a piece of work, it is advantageous for the operative to know exactly the distance the tool has been moved with respect to the piece when the tool controlling means are operated, because this distance determines the importance of the work that will be performed on the piece and, consequently the variation of dimension that will be undergone by said piece.

It has already been suggested to make use, for this purpose, of mechanical amplification micrometers which measure the displacement of the tool with respect to the piece of work, but these apparatus have some drawbacks. For one thing, they are provided with dials for indicating the measurements which are somewhat too small. Furthermore, these instruments are delicate and liable to rapid wear and tear and mechanical deteriorations. Consequently, the determination of an accurate dimension by means of such apparatus is difficult and not wholly reliable.

It is therefore interesting to fit machine-tools as are used for high precision work with amplifying micrometers working on another principle than mechanical amplification. In particular, it is advantageous to make use of pneumatic amplification micrometers of the kind of those above mentioned, which are considerably stronger and more accurate in their measurements than mechanical amplification apparatus. These pneumatic amplification micrometers permit of determining more easily, more accurately, more rapidly and with a higher accuracy the dimensions of piece or the relative displacement between some parts, for instance between a tool and a piece of work, and this with a precision which may be as high as $1/1000$ of a millimeter.

A high amplification of the indications of the magnitude to be measured however has the disadvantage that it is necessary to make use of a large dial or a large scale for reading these indications if it is desired to make measurements within wide limits and with a uniform ratio of amplification over the whole scale. For instance, if the scale on which the indications are read (case of a liquid column pressure gauge) (is 50 cms long and if variations of one thousandths of a millimeter are to correspond to a displacement of the liquid column of 10 mms. on said scale, the whole range of reading is limited, if all divisions are equal, to 50 thousands of a millimeter, which is clearly insufficient. It is therefore necessary to devise these measurement apparatus in such manner that the precision of the measurement decreases when the value of the magnitude that is being measured is more and more different from the particular value to be measured with maximum precision.

This results from the fact that it must be necessary to be able to measure in an industrial manner on the same piece or on the same machine, variations of dimension, length and displacement considerably greater than those ranging within the high precision zone. But these variations may be measured with a precision which is the lower as the value that is being measured is more remote from the high precision zone. The advantage of a measurement apparatus complying with such conditions is that, as the precision decreases gradually and slowly from the high precision zone, it is possible to obtain both a high amplification of measurement within a sufficiently wide zone of reading and a sufficiently wide range of measurement. This is for instance what occurs when a tool is engaged on a piece of work. At the beginning of the relatively quick feed of the tool, or during the first machining operation (roughing down), the operative must be able easily to follow the relative displacement of the tool with respect to the piece of work, or the variation of dimension of the piece itself. However, during this period of the machining a very high precision is not necessary. Thus, the operative can know when the high precision zone begins, for the finishing operation, which corresponds, for instance, only to a variation of distance or displacement of from ten to thirty thousandths of a millimeter. From this time on, as the operative follows, easily and accurately, the work that is being performed, he can prevent, with the maximum precision, the dimension of the piece from becoming too small, or the feed of the tool from being too great, which would give a badly machined piece, generally to be rejected.

The object of the present invention is to provide a pneumatic amplification micrometer of the type above referred to, which complies with the conditions above set forth.

With this object in view, according to a feature of the invention, the measurement method comprises measuring or checking the variation of the magnitude to be measured with an amplification which is variable in accordance with the importance of the variations of said magnitude, this amplification being maximum within a zone of variations which includes the tolerance limits to be complied with, whereas the next variation zones correspond to an amplification which is the lower as the value to be measured is more remote from the zone of maximum amplification.

According to another feature of the present invention, relating to the apparatus for carrying out the measurement, the second orifice is constituted by the space between two walls, located close to each other, one of which is stationary while the other is movable in response to variations of the magnitude to be measured, these walls being so shaped and dimensioned that they permit of obtaining, on the indicating manometer, predetermined variations of amplification in relation with the displacement of the movable wall with respect to the stationary wall.

According to still another feature of the present invention, the pneumatic micrometry apparatus include means for ensuring, without any substantial friction, the exclusion of foreign bodies or matters from the apparatus, that is to say for preventing the entrance of foreign bodies or matters into the clearance spaces between the fixed parts of the apparatus and the movable parts thereof, these means being constituted by passages or conduits for feeding a stream of gas under pressure, and in particular that used for the operation of the apparatus, to said clearance spaces.

According to a third feature of the present invention, I make use of at least two apparatus of the type above described, these apparatus having different amplification ratios and different manometric means, and I combine these apparatus in such manner that they can enter successively into action, in such manner as thus to increase the total length of the indication scale.

Other features of the present invention will result from the following detailed description of some examples.

Preferred embodiments of the present invention will be hereinafter described, with reference to the accompanying drawings, given merely by way of example, and in which:

Fig. 1 is a diagrammatic vertical sectional view of a pneumatic micrometer made according to a first embodiment of the invention;

Fig. 2 is a partial view, also in vertical section, of a modification of the micrometer shown by Fig. 1;

Fig. 3 is a view, similar to Fig. 2, corresponding to another modification of the micrometer of Fig. 1;

Fig. 4 is a diagrammatic vertical sectional view of another embodiment of the pneumatic micrometer according to the invention;

Fig. 5 is an elevational view, partly in section, of the arrangement of a micrometer according to the invention on a machine tool.

In Fig. 1, I have shown a pneumatic measurement apparatus made in the usual manner and accordingly made as follows: A permanent gas under pressure, for instance compressed air is fed through a conduit 1 and expanded in a suitable manner. In the example shown, the device for the expansion of compressed air consists of a chamber opening at 3 into the atmosphere and which contains a liquid, such as water, into which is immersed the lower end of a tube 4. This tube 4, which is connected with the end of conduit 1 through which gas (such as air) is fed under pressure, is open at its lower end. The excess of air escapes by passing through the liquid and escapes to the outside through orifice 3. Therefore the gas contained in tube 4 is at a uniform pressure determined by the level difference between the free surface of the liquid and the lower end of said tube 4.

The gas thus obtained at a rigorously uniform pressure flows through a passage $1^1$, connected with tube 4, and through a calibrated orifice 5 before entering a chamber 6.

The pressure existing in this chamber 6 is measured through manometric means of any suitable type and, advantageously by means of a liquid column manometer constituting a tube which communicates at its bottom with the inside of chamber 2 so that the liquid in tube 7 is fed from said chamber 2. A graduated scale $7^1$ makes it possible to determine the liquid level in this manometric tube 7.

The air fed to chamber 6 is conveyed through a pipe 8 to a chamber 9 provided in a box 10 acting as a housing for a valve 11. This valve is guided by means of its stem 12. This valve 11, when it is applied against its seat 13, rigid with box 10, by its spring 14, separates chamber 9, into which gas under pressure is fed, from a chamber 15, also provided in box 10 and through which the gas that has flown past valve 11 is evacuated to the atmosphere.

The stem 12 of valve 11 projects to the outside of box 10 and bears against the piece 16 a dimension of which is to be measured. Box 10 is kept in fixed position, for instance by means of a holder 17 tightened by a bolt 18 and mounted on a fixed part of the machine frame. Piece 16 rests upon a fixed support in such manner that variations of height of the top of this piece involve modifications of the vertical position of valve 11, and, as a consequence, modifications of the section of flow through the passage between chambers 9 and 15. These modifications in turn produce pressure modifications in tube 8 and consequently in chamber 6, so that they can be indicated by manometer 7. Graduated scale $7^1$ of this manometer can therefore be graduated in such manner as directly to indicate the value of the height of piece 16.

The variations of the height dimension of piece 16, which may be extremely small and which average, for instance, some thousandths of a millimeter, are thus amplified through the operation of valve 11 and produce very important variations of the free level of the liquid column of manometric device 7.

Thus the air stream flows through a circuit $1^1$—6—8—9—15 including a calibrated orifice 5 and, on the downstream side thereof, a second orifice constituted by the interval between valve 11 and valve seat 13 and which opens into space 15, in free communication with the atmosphere through a passage 20.

The construction and operation of the pneumatic micrometer, such as above described, are known in themselves and they do not constitute the subject matter of the present invention.

As above stated, it is very advantageous to obtain an amplification which is not uniform that is to say which varies according to the value of the magnitude that is being measured. It has been already explained that, if this amplification is to be very high within a zone of variation which includes the manufacturing tolerance limits of a piece, such as 16, the amplification must be considerably lower for values outside of this zone if it is desired to obtain the possibility of performing measurements within a sufficiently wide range of variation of the magnitude in question.

According to the present invention, in order to comply with these conditions, valve 11 and/or its seat 13 are made of suitable shape, for instance valve 11 is made in the shape of a frustum of a cone with a section, an apex angle, and/or a height, which are suitably chosen for the desired purpose.

Under these conditions, it is possible to obtain, as a function of the displacement of valve 11 with respect to its seat 13, a law of amplification which has been fixed in advance. This law is chosen in such manner that the amplification is maximum when the value of the magnitude to be measured is within zone $a$, which includes the manufacturing tolerance limits. In other words, on the indicating scale $7^1$ of the manometric device 7, the divisions or graduations are large in zone $a$. On the contrary the amplification gets lower and lower as the value of the magnitude to be measured is more different from the values corresponding to zone $a$. In other words, on scale $7^1$, outside of this zone $a$, the graduations are closer and closer to one another when moving along said scale away from zone $a$, that is to say in portions $b$ and $b^1$. With such an arrangement, it is possible to estimate large variations of dimension of piece 16, and this evaluation is the more precise as the true dimension of piece 16 is closer to the dimension to be obtained, and, on the contrary, more and more approximate as the actual dimension of piece 16 is more different from the value to be obtained.

It is clear that, in order to obtain a good operation of the device which has been just described, the sliding movement of the stem 12 of valve 11 in its guides $19^1$ and $19^2$ must take place with the minimum friction.

Box 10, which is rigid with seat 13, forms a chamber 15, which surrounds a portion of the stem 12 of valve 11, the bottom wall of this chamber being provided with a hole for the passage of said stem 12, so as to form an annular passage 20 through which compressed air, admitted into chamber 15 after it has flown past the seat 13 of valve 11, passes to the outside. From valve seat 13 to passage 20, this compressed air flows through orifices $19^0$ provided in the guides $19^1$ and $19^2$ of the valve stem.

With such an arrangement, there is permanently formed, around the lower end of valve stem 12, an air stream (as long as valve 11 is open) which prevents any possible entrance of a foreign body or matter in suspension in the surrounding atmosphere, into the clearance space between valve stem 12 and its guide, and therefore into the inside of chamber 15.

The embodiment of Fig. 1 is such that annular passage 20 is the only communication existing between chamber 15 and the outside, whereby the whole of the air admitted into this chamber is evacuated to the atmosphere through said passage 20.

In the modification shown by Fig. 2, the air coming from chamber 9, after flowing past the seat 13 of valve 12 into the space 15 below said valve escapes directly to the outside through one or several orifices 21, because, in this construction, the valve guides $19^1$ and $19^2$ are not provided with passages such as the passages $19^0$ of the embodiment of Fig. 1. In the present embodiment, on the contrary, I provide in chamber 19, around the lower end of stem 12, a chamber 22 permanently fed with air under pressure through a conduit 23, communicating for instance with a source of compressed air, such for instance as conduit 1. With this arrangement, annular passage 20 constantly receives a stream of compressed air, even when valve 11 is applied upon its seat.

In the other modification which is illustrated by Fig. 3, a similar chamber 22 is fed with compressed air from chamber 9 through a branch pipe 24 provided with a calibrated orifice 25 adapted to limit the rate of flow through said pipe.

In this case, of course, it is necessary, when graduating scale $7^1$, to take into account the permanent flow of air through annular passage 20, which takes place even when valve 11 is closed.

Fig. 4 shows another embodiment of a pneumatic measurement apparatus according to the invention.

In this embodiment of my invention, the apparatus includes two elements of the kind illustrated by Fig. 1, that is to say two devices comprising each means for feeding gas under uniform pressure, manometric indicating means, and means for the exhaust of the gas under pressure to the atmosphere past a valve operative in accordance with variations of the magnitude to be measured. In Fig. 4 all the parts are designated by the same reference numbers as in Fig. 1, with indexes 1 or 2 according as they belong to one or the other of the apparatus elements.

The two valve devices are mounted on fixed holders $17^1$ and $17^2$ which may belong, for instance, to the same frame, and in such manner that the stems $12^1$ and $12^2$ of valves $11^1$ and $11^2$ are located on the same vertical line and that, in the state of rest, that is to say when valves $11^1$ and $11^2$ are applied against their respective seats $13^1$ and $13^2$, said valve stems $12^1$ and $12^2$ are not in contact with each other.

Each of these valve devices is connected, through a pipe $8^1$ or $8^2$ respectively, with its manometer $7^a$ or $7^b$ (these manometers being distinct from each other), itself connected with the corresponding chamber $6^1$ or $6^2$. These chambers $6^1$ and $6^2$ are themselves fed with compressed air through calibrated orifices $5^1$ and $5^2$, respectively. In the embodiment shown by the drawing, both of these calibrated orifices open from the same tube 4, the lower part of which is immersed in the liquid of chamber 2.

When the height H of the piece 16 which is to be measured is too great, and substantially in excess of the value that has been fixed, valve $11^1$ is open and its stem $12^1$ acts upon the stem $12^2$ of the second valve $11^2$ in such manner as to keep also said second valve in the open position. In this case, both of the liquid columns of the manometric devices $7^a$ and $7^b$ are practically at the top of the corresponding graduated scales $7^1$ and $7^2$.

If this height H decreases, that is to say, for instance, if another piece 16 of smaller height is placed under valve stem $12^1$, valves $11^1$ and $11^2$ come closer to their respective seats. But, owing to a suitable choice of the length and/or the position of valve stems $12^1$ and $12^2$, as this height H becomes smaller and smaller, valve $11^2$ closes before valve $11^1$, as shown by Fig. 4. Consequently, the liquid column of manometer $7^b$ is the first to drop, and the graduation of manometric scale $7^2$, which corresponds to said manometer $7^b$, is established in such manner as to permit of reading the variations of height H of pieces 16 with a relatively low amplification but with a large range of variation of this height H.

When valve $11^2$ is applied against its seat $13^2$, the corresponding liquid column $7^b$ is at the bottom of the corresponding graduated scale $7^2$. From this time on, and as the height H further decreases so as to come closer and closer to the value fixed for this height, valve $11^1$, which is now the only one in operation, comes nearer and nearer to its seat $13^1$, and the liquid column of manometer $7^a$ starts dropping, which makes it possible to read the variations of H on the graduated scale $7^1$ of this manometer with an amplification which is substantially higher than that applied for the other graduated scale $7^2$, but with a narrower range of variation of this height H.

In order to obtain an operation of the pneumatic micrometric apparatus as above described, the following elements are to be suitably chosen:

1. A suitable relation of the respective positions of valves $11^1$ and $11^2$ relatively to each other, that is to say a proper choice of the respective locations and lengths of their stems $12^1$ and $12^2$;

2. The shape of these valves and of their respective seats to determine the law of variation of the amplification for each of them;

3. The sections of orifices $5^1$ and $5^2$, in such manner as to obtain an amplification which, while remaining maximum within the desired zone (which zone will be chosen in such manner as to include the tolerance limits of H) also permits a wide range of reading, since, on the one hand, it has been shown that the amplification may be chosen lower when the measurements are made outside of the high precision zone, and, on the other hand, the effective length of the indicating scale is doubled, or approximately so, since the two liquid columns are brought into action practically one after the other.

In particular, the various parts may be chosen in such manner that one of the valves, say $11^1$, gives the measurement with a high precision while the other one, $11^2$, corresponds to a measurement of lower precision. It is possible, for the person that uses the apparatus, to appreciate the passage from the lower precision zone to the high precision zone when reading on graduated scale $7^1$ is substituted for reading on graduated scale $7^2$.

It is possible, according to the present invention, to make use of a number of valve devices greater than two, that is to say three, four, five and even more, each device acting upon a different graduated scale, respectively, and I can thus increase at will the length of the indicating scale.

In Fig. 5, I have shown an example of application of the device according to the present invention to a machine tool, for instance, but not necessarily, to a rectifying machine.

In this application of my invention, the frame of the machine tool, designated by reference character 26 is provided with a support 27 which carries a piece of work 28 to be acted by a truing wheel 29 carried by a wheel holder 30. Modification of the dimension of piece 28 is obtained by displacing the wheel holder 30, which is adapted to slide on frame 26, this displacement being effected by means of a hand wheel 31 actuated by the operative in charge of the machine.

On the machine frame 26 is fixed a holder or clip 17 adapted to keep in position a box 10 with its valve 11, said box being tightly held by means of a bolt 18. This box, made analogous to any of those just above described with reference to Figs. 1 to 3 inclusive, is for instance that shown by Fig. 1. It is supplied through a pipe 8 which feeds a compressed permanent gas (such for instance as air), the pressure of which is measured by means of manometer 7, the graduated scale $7^1$ of which is advantageously located close to the operative which is to operate the hand-wheel 31.

The stem 12 of valve 11 is in contact with a rod 32 screwed in a piece 33 which is fixed to wheel holder 30 so as to move together therewith. The position of this rod 32 with respect to piece 33 can easily be adjusted by means of its head 34, by screwing or unscrewing it in said piece, and it can be secured in the desired position by means of a lock nut 35.

Such a device will work in the following manner:

In the course of the operation which consists in truing piece of work 28 for instance, the operative, who actuates the wheel holder 30 by means of hand-wheel 31, first takes relatively heavy cuts so as to bring piece 28 to a dimension close to its final dimension. During these operations, it is of course advantageous to know the amplitude of the displacements of wheel-holder 30, in order to know the variation of dimension that has been undergone by the piece of work in the course of these operations. The desired indications are then read on the graduated scale $7^1$ of manometric device 7.

The readings, during this period of the machining, are in a zone, such as b, which may correspond to a relatively low precision since the final dimension of piece 28 corresponds to another position of wheel-holder 30.

Thus the operative follows, on the graduated scale of the manometer, the displacement of wheel-holder 30. After a certain time, the liquid column shows that the high precision zone a is reached and, therefore, that the piece of work 28 is getting close to the final dimension it must be given. Once the liquid column is in this zone a, the amplification of the movement of the wheel holder 30 is maximum, and the operative can easily know, with a precision of the order of the thousandth of a millimeter, the value of the displacement of the wheel holder 30 in response to the rotation imparted to hand-wheel 31.

The operative is thus quite sure, by carefully following the indications given by the manometric device, that he will not overshoot the mark, and he can very accurately bring the wheel holder 30 into the necessary position for performing upon the piece of work 31 the operation that will give the latter the exact dimension to be finally obtained in accordance with the manufacturing requirements, account being taken of the tolerance limits.

Whatever be the particular embodiment that is chosen, I obtain, according to my invention, a pneumatic micrometer which fully answers the requirements above set forth.

The possible kinds of application of such an apparatus, for the measurement of variations of distance, of dimension, or of displacement with a gradually variable amplification are practically unlimited.

Of course, the apparatus according to my invention can be used not only with a truing or rectifying machine of the type illustrated by Fig. 4, but with all kinds of other machines in which the machining of a piece is obtained through a relative displacement of the working tool with respect to said piece, or inversely.

In a general manner, while I have, in the above description, disclosed what I deem to be practical and efficient embodiments of the present invention, it should be well understood that I do not wish to be limited thereto as there might be changes made in the arrangement, disposition, and form of the parts, without departing from the principle of the present invention as comprehended within the scope of the appended claims.

What I claim is:

1. A pneumatic micrometry apparatus for measuring a magnitude, and especially a dimension of a piece of work, which comprises, in combination, a circuit for the flow of a gas stream, this circuit including, in series, a calibrated orifice and a second orifice, forming a valve seat, located behind said calibrated orifice and opening into a medium at uniform pressure, means for feeding a permanent gas under uniform pressure to said circuit before said calibrated orifice, a valve arranged to cooperate with said valve seat, a valve stem for said valve movable in response to variations of the magnitude to be measured so as to be positioned with respect to said valve seat in accordance with the value of said magnitude, whereby the pressure indicated by said manometric means is a function of the value of said magnitude, and means rigid with said valve seat forming a chamber surrounding a portion of said valve stem and in communication with the portion of said circuit between said two orifices, said stem extending with a substantial clearance through a hole provided in one wall of said chamber into said meduim at uniform pressure, whereby gas from said portion of said circuit escapes into said medium through said clearance.

2. A pneumatic micrometry apparatus for measuring a magnitude, and especially a dimension of a piece of work, which comprises, in combination, a circuit for the flow of a gas stream, this circuit including, in series, a calibrated orifice and a second orifice, forming a valve seat, located behind said calibrated orifice and opening into a medium at uniform pressure, means for feeding a permanent gas under uniform pressure to said circuit before said calibrated orifice, a valve arranged to cooperate with said valve seat, a valve stem for said valve movable in response to variations of the magnitude to be measured so as to be positioned with respect to said valve seat in accordance with the value of said magnitude, whereby the pressure indicated by a manometric means is a function of the value of said magnitude, and means rigid with said valve seat forming a chamber surrounding a portion of said valve stem and in communication through said second orifice with the portion of said circuit between said two orifices, said stem extending with a substantial clearance through a hole provided in one wall of said chamber into said medium at uniform pressure, whereby gas from said portion of said circuit escapes into said medium through said clearance.

3. A pneumatic micrometry apparatus for measuring a magnitude, and especially a dimension of a piece of work, which comprises, in combination, a circuit for the flow of a gas stream, this circuit including, in series a calibrated orifice and a second orifice, forming a valve seat, located behind said calibrated orifice and opening into a medium at uniform pressure, means for feeding a permanent gas under uniform pressure to said circuit before said calibrated orifice, a valve arranged to cooperate with said valve seat, a valve stem for said valve movable in response to variations of the magnitude to be measured so as to be positioned with respect to said valve seat in accordance with the value of said magnitude, whereby the pressure indicated by a manometric means is a function of the value of said magnitude means, fixed with respect to said valve seat, forming a chamber surrounding a portion of said valve stem, and a conduit, provided with a calibrated orifice, branching off from the portion of said circuit between said two orifices for feeding gas from said circuit directly to said chamber, said stem extending with a substantial clearance through a hole provided in one wall of said chamber into said medium at uniform pressure, whereby gas from said portion of said circuit escapes into said medium through said clearance.

MARCEL MENNESSON.

REFERENCES CITED

The following references are of record in the file of this patent:

UNITED STATES PATENTS

| Number | Name | Date |
|---|---|---|
| 1,245,599 | Booth | Nov. 6, 1917 |
| 1,982,528 | Mennesson | Nov. 27, 1934 |
| 1,985,576 | Mennesson | Dec. 25, 1934 |
| 2,057,576 | Johnson | Oct. 13, 1936 |
| 2,259,472 | Johnson | Oct. 21, 1941 |
| 2,369,319 | Smith | Feb. 13, 1945 |
| 2,374,154 | Moore | Apr. 17, 1945 |
| 2,397,494 | Kuppersmith | Apr. 2, 1946 |
| 2,408,672 | Mennesson | Oct. 1, 1946 |
| 2,457,297 | Aller | Dec. 28, 1948 |
| 2,504,212 | Mennesson | Apr. 18, 1950 |